US010529085B2

(12) United States Patent
Bitan et al.

(10) Patent No.: US 10,529,085 B2
(45) Date of Patent: Jan. 7, 2020

(54) HARDWARE DISPARITY EVALUATION FOR STEREO MATCHING

(71) Applicant: SAMSUNG ELECTRONICS CO., LTD., Suwon-si, Gyeonggi-do (KR)

(72) Inventors: Gal Bitan, Petach Tikva (IL); Haim Azaria, Netanya (IL)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 96 days.

(21) Appl. No.: 15/941,721

(22) Filed: Mar. 30, 2018

(65) Prior Publication Data

US 2019/0304117 A1 Oct. 3, 2019

(51) Int. Cl.
*G06K 9/00* (2006.01)
*G06T 7/593* (2017.01)

(52) U.S. Cl.
CPC .... *G06T 7/593* (2017.01); *G06T 2207/10012* (2013.01); *G06T 2207/20228* (2013.01)

(58) Field of Classification Search
None
See application file for complete search history.

(56) References Cited

U.S. PATENT DOCUMENTS

| | | | | |
|---|---|---|---|---|
| 5,867,591 A * | 2/1999 | Onda | ............ | G01C 11/06 382/154 |
| 7,103,212 B2 * | 9/2006 | Hager | ............ | G06K 9/32 382/154 |
| 7,362,219 B2 * | 4/2008 | Nogami | ............ | G06K 7/10079 340/505 |
| 10,269,331 B2 * | 4/2019 | Sato | ............ | G06T 11/60 |
| 2004/0258279 A1 * | 12/2004 | Hirvonen | ............ | G06K 9/00201 382/104 |
| 2006/0023073 A1 * | 2/2006 | Li | ............ | H04N 7/17318 348/211.99 |

(Continued)

FOREIGN PATENT DOCUMENTS

KR 2016063039 A * 6/2016

OTHER PUBLICATIONS

Binary Stereo matching, Kang Zhang et al., ICPR, 978-4-9906441-0-9, 2012 pp. 356-359 (Year: 2012).*

(Continued)

*Primary Examiner* — Jayesh A Patel
(74) *Attorney, Agent, or Firm* — F. Chau & Associates, LLC (57) ABSTRACT

A method for calculating disparity in a pair of images includes receiving a first image of a scene and designating the first image as a master image. A second image of the scene is received, and the second image is designated as a slave image. The master image is binarized to produce a binarized master image. The slave image is binarized to produce a binarized slave image. A matching cost associated with matching each pixel within the binarized master image with a corresponding set of candidate pixels within the binarized slave image is calculated. A probability density function is created based on the calculated matching costs associated with each pixel within the binarized master image. The created probability density function is used to produce a disparity for the master image and the slave image and to produce a confidence for the produced disparity.

20 Claims, 6 Drawing Sheets

(56) References Cited

U.S. PATENT DOCUMENTS

| | | | | |
|---|---|---|---|---|
| 2007/0031037 A1* | 2/2007 | Blake | ................ | G06K 9/00234 |
| | | | | 382/173 |
| 2008/0002860 A1* | 1/2008 | Super | ................ | G06K 9/00375 |
| | | | | 382/114 |
| 2008/0112592 A1* | 5/2008 | Wu | ................ | A61B 5/1113 |
| | | | | 382/103 |
| 2008/0253606 A1* | 10/2008 | Fujimaki | ................ | G08G 1/161 |
| | | | | 382/100 |
| 2009/0180682 A1* | 7/2009 | Camus | ................ | G06T 7/0002 |
| | | | | 382/154 |
| 2010/0315490 A1* | 12/2010 | Kim | ................ | H04N 13/239 |
| | | | | 348/47 |
| 2012/0262553 A1* | 10/2012 | Chen | ................ | G01B 11/25 |
| | | | | 348/47 |
| 2014/0205182 A1* | 7/2014 | Ono | ................ | H04N 13/128 |
| | | | | 382/154 |
| 2015/0288943 A1* | 10/2015 | Kuranuki | ................ | G01S 5/16 |
| | | | | 348/47 |
| 2016/0373719 A1* | 12/2016 | Ge | ................ | G06T 7/521 |
| 2018/0213201 A1* | 7/2018 | Zhang | ................ | G06T 7/97 |
| 2018/0272991 A1* | 9/2018 | Tayama | ................ | B60R 25/252 |

OTHER PUBLICATIONS

Depth discontinuities by pixel-to-pixel stereo, Stan Birchfield at el., IJOCV, (35)3, 1999, pp. 269-293 (Year: 1999).*

Learning to detect ground control points—Matching, Aristotle Spyropoulos et al., CVPR, 2014, pp. 1-8 (Year: 2014).*

* cited by examiner

HARDWARE DISPARITY EVALUATION FOR STEREO MATCHING

TECHNICAL FIELD

The present disclosure relates to depth mapping based on image disparity and, more specifically, to hardware disparity evaluation for stereo matching.

DISCUSSION OF THE RELATED ART

Stereo images may be acquired using a camera arrangement in which two images are captured from a slightly different angle. The different angle creates a disparity between the arrangement of each image. By analyzing the disparity, a sense of depth may be understood. However, before disparity may be analyzed, features must first be matched across both images.

SUMMARY

A method for calculating disparity in a pair of images includes receiving a first image of a scene and designating the first image as a master image. A second image of the scene is received, and the second image is designated as a slave image. The master image is binarized to produce a binarized master image. The slave image is binarized to produce a binarized slave image. A matching cost associated with matching each pixel within the binarized master image with a corresponding set of candidate pixels within the binarized slave image is calculated. A probability density function is created based on the calculated matching costs associated with each pixel within the binarized master image The created probability density function is used to produce a disparity for the master image and the slave image and to produce a confidence for the produced disparity.

The steps of binarizing the master and slave images, calculating the matching costs, creating the probability density function, and producing the disparity and confidence may be performed within a special-purpose digital signal processor.

The special-purpose digital signal processor may operate in real-time.

Binarizing each of the master image and slave image may include defining a list of supports of increasing size, selecting a pixel, selecting a support for the selected pixel from the defined list of supports, calculating a mean and standard deviation for the selected support about the selected pixel, assigning a binarized pixel value or selecting a next support according to a difference between the calculated mean and the selected pixel relative to a predetermined fraction of the calculated standard deviation, and repeating the steps of selecting the pixel, selecting the support, calculating the mean and standard deviation, and assigning a binarized pixel value for each pixel of the master image.

Assigning a binarized pixel value or selecting a next support according to a difference between the calculated mean and the selected pixel relative to a predetermined fraction of the calculated standard deviation may include assigning the binarized pixel value as "1" when it is determined that the difference between the calculated mean and the selected pixel exceeds the predetermined fraction of the calculated standard deviation, assigning the binarized pixel value as "0" when it is determined that the difference between the calculated mean and the selected pixel is below the predetermined fraction of the calculated standard deviation, and selecting a next support when it is determined that the difference between the calculated mean and the selected pixel is within the predetermined fraction of the calculated standard deviation.

Calculating the matching cost may include selecting a pixel in the binarized master image, selecting a match candidate in the binarized slave image, calculating a matching cost for the selected pixel in the binarized master image and the selected match candidate in the binarized slave image, and repeating the steps of selecting the pixel in the binarized master image, selecting the match candidate in the binarized slave image, and calculating the matching cost, for each pixel of the binarized master image and each corresponding match candidate in the binarized slave image.

The probability density function may be determined based on the calculated matching costs for each pixel of the binarized master image and each corresponding match candidate in the binarized slave image.

The first image and the second image may be acquired from two cameras, a single camera with two image sensors, or a single camera moved between two locations and/or two angles.

The produced disparity may be instantiated as an image including a plurality of pixels, the value of each being set according to a degree of disparity between the first image and the second image at a corresponding pixel location.

The value of each of the plurality of pixels of the disparity image may be greater for greater disparities and lesser for lesser disparities.

The produced confidence may be instantiated as an image including a plurality of pixels, the value of each being set according to a degree of confidence for a corresponding pixel of the disparity image.

The value of each of the plurality of pixels of the confidence image may be greater for greater degrees of confidence and lesser for lesser degrees of confidence.

A system for generating a 3D model includes one or more cameras for acquiring a first image of a scene and a second image of the scene. A digital signal processor binarizes the acquired first image to produce a binarized master image. The acquired second image is binarized to produce a binarized slave image. A matching cost associated with matching each pixel within the binarized master image with a corresponding set of candidate pixels within the binarized slave image is calculated. A probability density function is created based on the calculated matching costs associated with each pixel within the binarized master image. The created probability density function is used to produce a disparity image for the master image and the slave image and to produce a confidence image for the produced disparity. A display device displays a three-dimensional rendering based on the produced disparity image and/or the produced confidence image.

The special-purpose digital signal processor may be configured to operate in real-time.

The special-purpose digital signal processor may be configured to binarize each of the master image and slave image by defining a list of supports of increasing size, selecting a pixel, selecting a support for the selected pixel from the defined list of supports, calculating a mean and standard deviation for the selected support about the selected pixel, assigning a binarized pixel value or selecting a next support according to a difference between the calculated mean and the selected pixel relative to a predetermined fraction of the calculated standard deviation, and repeating the steps of selecting the pixel, selecting the support, calculating the mean and standard deviation, and assigning a binarized pixel value for each pixel of the master image.

The special-purpose digital signal processor may be configured to calculate the matching cost, by selecting a pixel in the binarized master image, selecting a match candidate in the binarized slave image, calculating a matching cost for the selected pixel in the binarized master image and the selected match candidate in the binarized slave image, and repeating the steps of selecting the pixel in the binarized master image, selecting the match candidate in the binarized slave image, and calculating the matching cost, for each pixel of the binarized master image and each corresponding match candidate in the binarized slave image.

The special-purpose digital signal processor may be configured to produce the disparity image such that a value of each pixel of the disparity image is set according to a degree of disparity between the first image and the second image at a corresponding pixel location, where the value of each of the plurality of pixels of the disparity image are greater for greater disparities and lesser for lesser disparities, and to produce the confidence image such that a value of each pixel of the confidence image is set according to a degree of confidence for a corresponding pixel of the disparity image, where the value of each of the plurality of pixels of the confidence image are greater for greater degrees of confidence and lesser for lesser degrees of confidence.

A computer system includes a processor and a non-transitory, tangible, program storage medium, readable by the computer system, embodying a program of instructions executable by the processor to perform method steps for calculating disparity in a pair of images The method includes receiving a first image of a scene and designating the first image as a master image, receiving a second image of the scene and designating the second image as a slave image, binarizing the master image to produce a binarized master image, binarizing the slave image to produce a binarized slave image, calculating a matching cost associated with matching each pixel within the binarized master image with a corresponding set of candidate pixels within the binarized slave image, creating a probability density function based on the calculated matching costs associated with each pixel within the binarized master image, and using the created probability density function to produce a disparity for the master image and the slave image and to produce a confidence for the produced disparity.

Binarizing each of the master image and slave image may include defining a list of supports of increasing size, selecting a pixel, selecting a support for the selected pixel from the defined list of supports, calculating a mean and standard deviation for the selected support about the selected pixel, assigning a binarized pixel value or selecting a next support according to a difference between the calculated mean and the selected pixel relative to a predetermined fraction of the calculated standard deviation, and repeating the steps of selecting the pixel, selecting the support, calculating the mean and standard deviation, and assigning a binarized pixel value for each pixel of the master image.

Calculating the matching cost includes selecting a pixel in the binarized master image, selecting a match candidate in the binarized slave image, calculating a matching cost for the selected pixel in the binarized master image and the selected match candidate in the binarized slave image, and repeating the steps of selecting the pixel in the binarized master image, selecting the match candidate in the binarized slave image, and calculating the matching cost, for each pixel of the binarized master image and each corresponding match candidate in the binarized slave image.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention relate to systems and methods for matching features from disparate stereo images such as from a pair of images that have been acquired from different angles. By matching features from between a pair of disparate images, disparity may be evaluated, and depth may be mapped.

In performing feature matching, prior art approaches are complicated by differences between the cameras used to acquire the image pair and differences in the way the same features present themselves within the pair of images. For example, even where the cameras used are close to identical, differences such as lighting, color balance, and acquisition noise may hinder matching. These drawbacks and problems may become especially acute when performing feature matching using hardware solutions.

Exemplary embodiments of the present invention reduce these and other complications and therefore may provide an advantageous and technically superior approach to performing feature matching within stereo images. By utilizing these approaches, feature matching may be performed more quickly and with higher accuracy than when using conventional approaches, particularly, when embodied as a special-purpose hardware processor.

Figure 1:
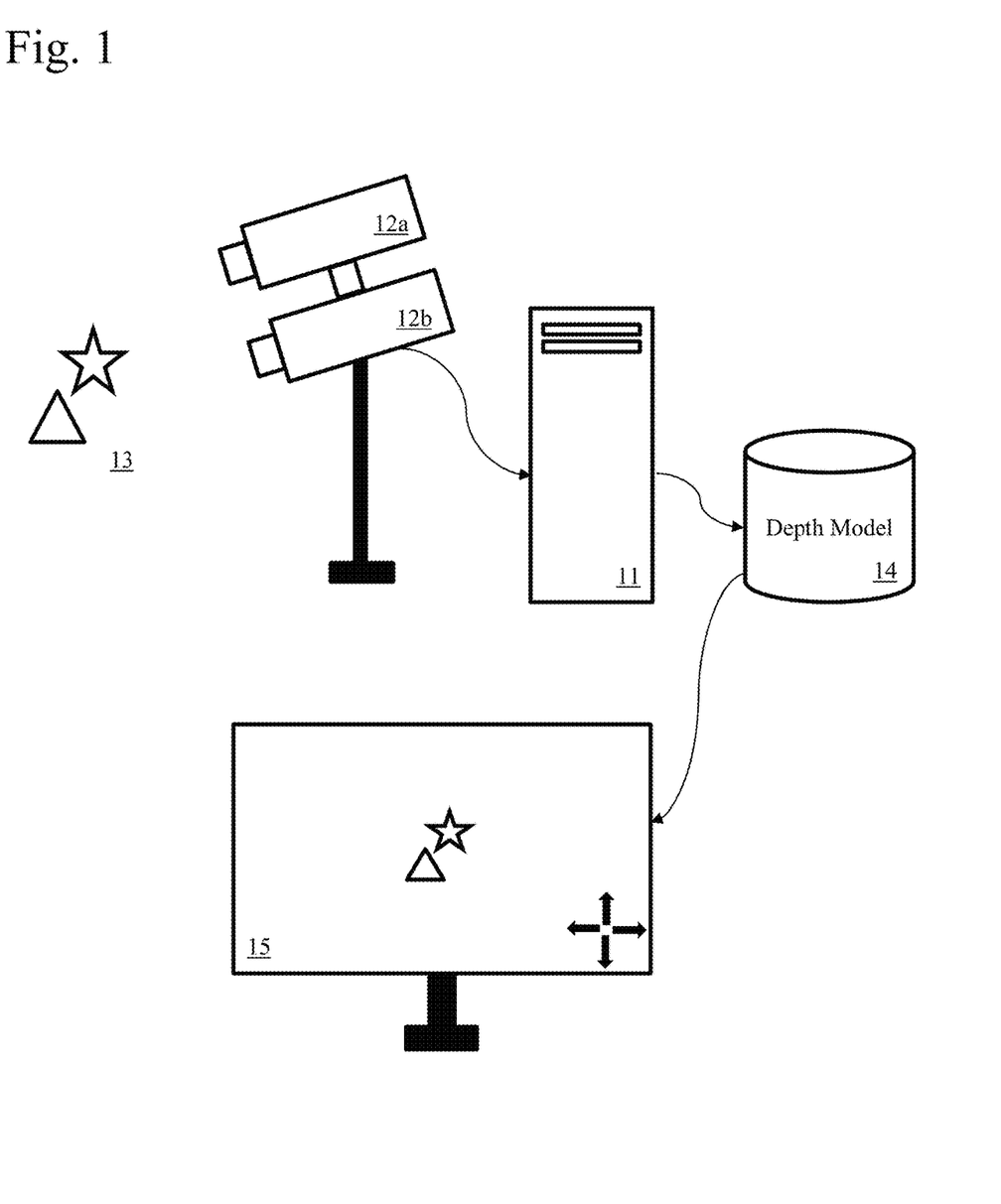
FIG. 1 is a schematic diagram illustrating an arrangement for performing feature matching in stereo images in accordance with exemplary embodiments of the present invention.

FIG. 1 is a schematic diagram illustrating an arrangement for performing feature matching in stereo images in accordance with exemplary embodiments of the present invention. As can be seen, a pair of cameras 12a and 12b may be used to acquire stereo imagery. It is to be understood that stereo images may alternatively be acquired using a single camera such as a camera having two image sensors, dual photodiodes, or by taking two images from a camera that is re-oriented between image captures. The stereo imagery may include a pair of images that may be referred to as a left-eye image and a right-eye image, but will be referred to herein as a master image and a slave image. The disparity is calculated with respect to the master image. These images may be still images or may capture motion over a sequence of image frames.

The cameras 12a and 12b may capture images of a scene 13, which may include a plurality of elements (here represented as a star and triangle). An image processor 11 may receive the master and slave images and may perform feature matching across the images, as will be described in detail below. The image processor 11 may then analyze the matched features across master and slave images and generate a disparity map showing the correspondences between the two images. The image processor 11 may also produce a confidence map showing a degree of confidence in the correspondences. The disparity map and the confidence map may then be used by the image processor 11 to generate a depth model 14, which may be a three-dimensional ("3D") model of the scene 13. The 3D model may then be used to perform various analytical methods useful to science and medicine. Moreover, the 3D model may be rendered using a display device 15 so that a viewer may visualize the scene 13 as a 3D model (e.g. a point cloud).

Exemplary embodiments of the present invention are able to more effectively perform feature matching by applying a novel binarization technique to each of the master and slave images. By performing binarization, feature matching may become computationally less expensive and more accurate. Binarization is a process by which an image, for example, a full color image, is changed into a monochrome image where each pixel has a value of "one" or "zero", However, as the effectiveness of feature matching on binarized images may depend on the techniques used to perform binarization, exemplary embodiments of the present invention provide novel approaches for performing binarization that lead to advantages and technical improvements to feature matching.

Figure 2:
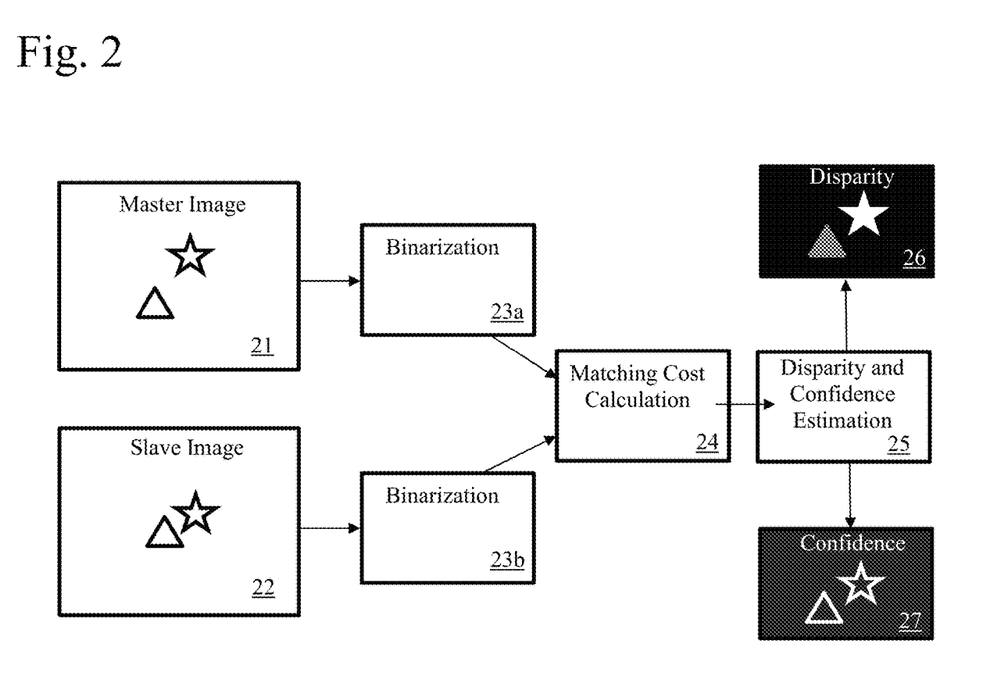
FIG. 2 is a flowchart illustrating an approach for performing feature matching of stereo images in accordance with exemplary embodiments of the present invention.

FIG. 2 is a flowchart illustrating an approach for performing feature matching of stereo images in accordance with exemplary embodiments of the present invention. The acquired stereo images may include a master image 21 and a slave image 22. The master image 21 may be binarized 23a and the slave image 22 may be binarized as well. Feature matching may then be performed on each of the two binarized images using a matching cost calculation 24 that calculates matching costs associated with each pixel of the master image and match candidates of the slave image. Matches are identified according to the match costs.

From there, disparity and confidence may be estimated. Disparity 26 may represent a degree of distance between corresponding features in the master and slave images, while confidence may represent a degree of likelihood in the disparity value being correct. Together the disparity 26 and confidence 27 may be used to generate a 3D model and/or perform other useful analysis.

Figure 3:
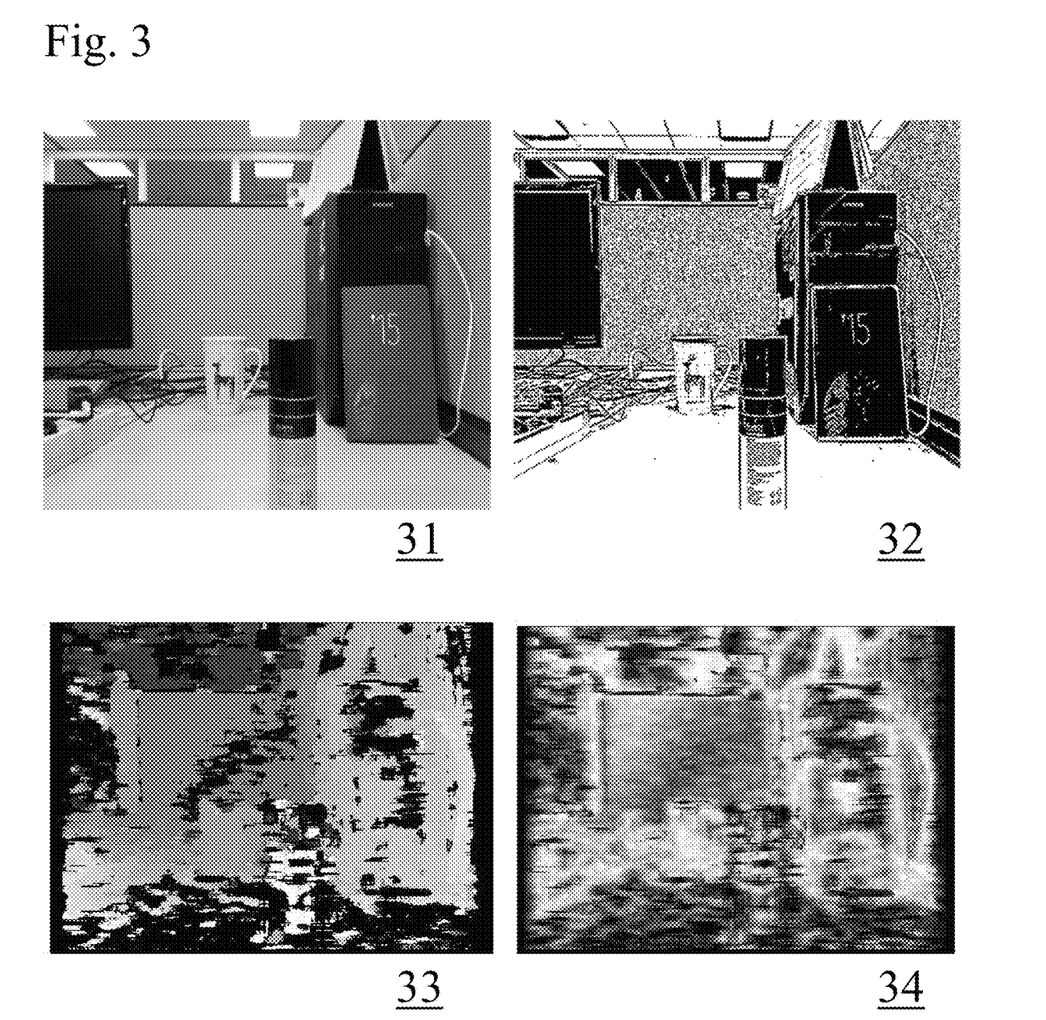
FIG. 3 shows a sequence of images calculated in accordance with exemplary embodiments of the present invention.

FIG. 3 shows a sequence of images calculated in accordance with exemplary embodiments of the present invention. Image 31 represents an original image acquired using a camera. The original image may be a master image or a slave image. The original image may be a color or grayscale image. Image 32 represents a binarized image produced from image 31. The binarized image 32 is monochromatic and each pixel thereof has a value of either "1" for example, representing white or "0" for example, representing black. From the binarized image, a disparity image 33 may be estimated. In the disparity image 33, the color of the pixel represents a measure of disparity between corresponding pixels of the master and slave images. For example, lighter pixels may represent smaller disparities while darker pixels may represent larger disparities.

Image 34 represents a confidence image where, for example, lighter pixels represent higher degrees of confidence between the corresponding pixels of the master and slave images, while darker pixels represent lower degrees of confidence between the corresponding pixels.

Figure 4:
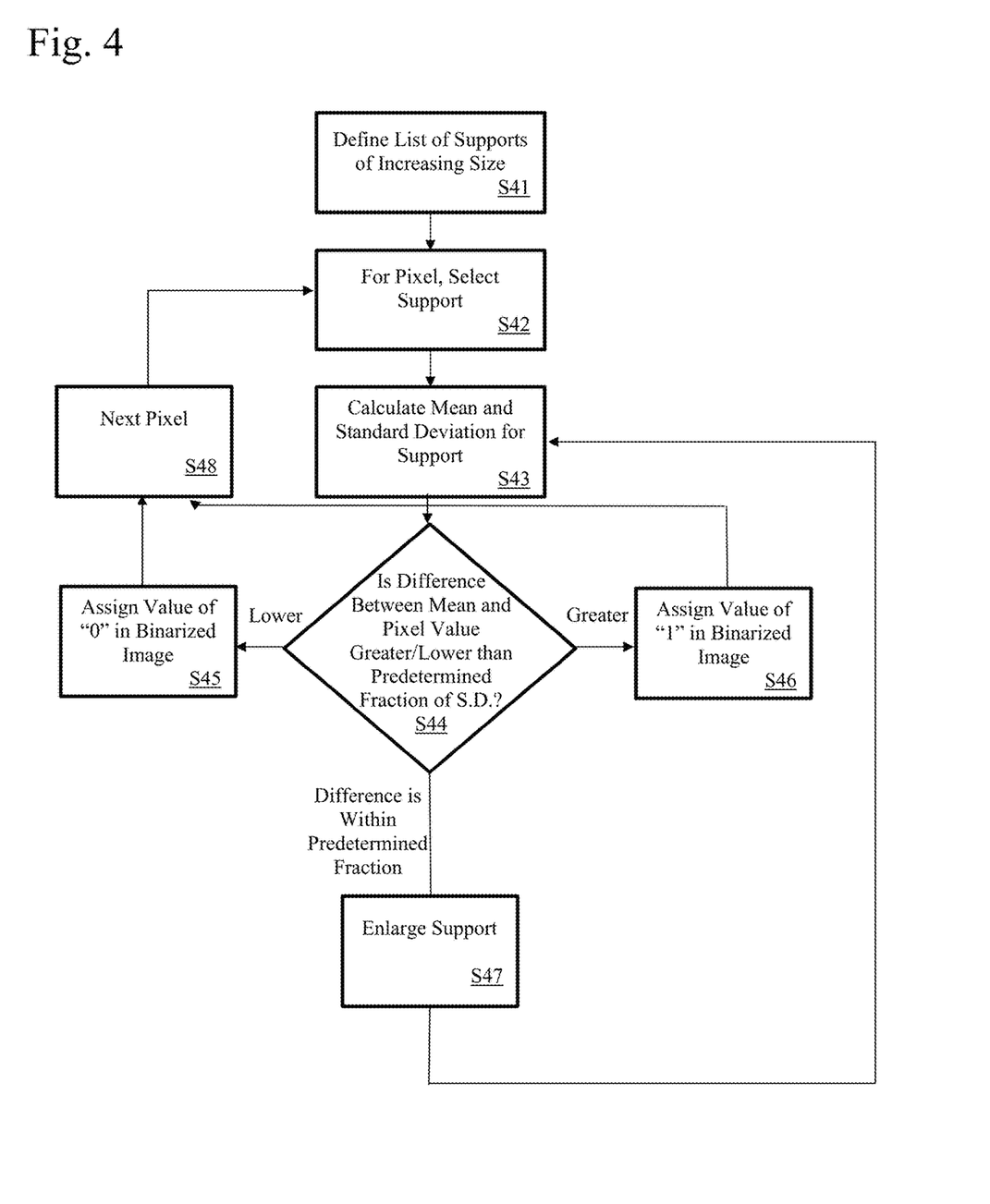
FIG. 4 is a flow chart illustrating an algorithm for performing binarization, in accordance with exemplary embodiments of the present invention.

An algorithm for performing binarization, in accordance with exemplary embodiments of the present invention, includes the following steps, which are illustrated in the flow chart of FIG. 4. First, a list of supports may be defined (Step S41). Supports, as used herein, are neighborhoods of pixels within the master image. The supports may be defined to have various different sizes that are arranged from smallest to largest. Thus, a first support may define a first area about the particular pixel while a second support may define a larger area about the particular pixel. There may be any number of supports defined, with each subsequent support having a larger area and all supports being centered about the particular pixel.

Then, for each pixel of the master image, a support may be selected (Step S42). The selection of pixels may be performed in any order, but might proceed according to a raster pattern on the image. The selection of supports, as defined in the list of supports, may begin with the smallest support.

For the pixel and support selected, a mean pixel value and standard deviation of pixel values may be calculated (Step S43). The mean pixel value may be calculated, for example, by adding up the value of each pixel within the support and dividing the sum by the total number of pixels within the support. The standard deviation of the pixel values may be calculated according to the degree by which the value of each pixel within the support deviates from the mean. Then the value of the particular pixel may be compared to the mean pixel value for the support to determine whether the pixel value is within a predetermined fraction of the calculated standard deviation (Step S44). This predetermined fraction may be set according to the needs of the images being analyzed, but may be, for example, ½, ⅓, ¼, or ⅕, etc.

If it is determined that the difference between the value of the particular pixel and the mean is greater than the predetermined fraction of the standard deviation, then a value of "1" may be assigned for the corresponding pixel of the binarized image (Step S46). If it is determined that the difference between the value of the particular pixel and the mean is less than the predetermined fraction of the standard deviation, then a value of "0" may be assigned for the corresponding pixel of the binarized image (Step S45). However, it is to be understood that these value assignments are arbitrary and may be reversed, if desired. If however, the difference between the value of the particular pixel and the mean is within the predetermined fraction of the standard deviation, then the comparison is nonconclusive and so the support is enlarged (Step S47), which is to say, a larger support is selected next, and then the process may repeat to see if a conclusive determination may be made at the larger support. This loop may continue until either a conclusive determination can be made or the largest support (which may be the entire image) is checked and the result is still nonconclusive, in which case a default value, for example, "1" may be selected for the corresponding pixel of the binarized image. However, this default value is arbitrary and a default value of "0" may alternatively be used.

Where a conclusive determination is made (the difference between the value of the particular pixel and the mean is greater than the predetermined fraction of the standard deviation Step S45 or the difference between the value of the particular pixel and the mean is less than the predetermined fraction of the standard deviation Step S46), a next pixel is selected (Step S48) and then the process may be repeated in this manner for each pixel until it has been performed for all pixels.

As discussed above, after binarization has been performed for each of the master and slave images, matching cost calculation may be performed between the pair of binarized images. The above-described approach for performing binarization has the advantage of preserving edges and textures to a high degree, which is to say, the edges and textures of the original image are still apparent within the binarized image, while allowing for a highly reliable and computationally inexpensive calculation of the matching costs therefrom.

Figure 5:
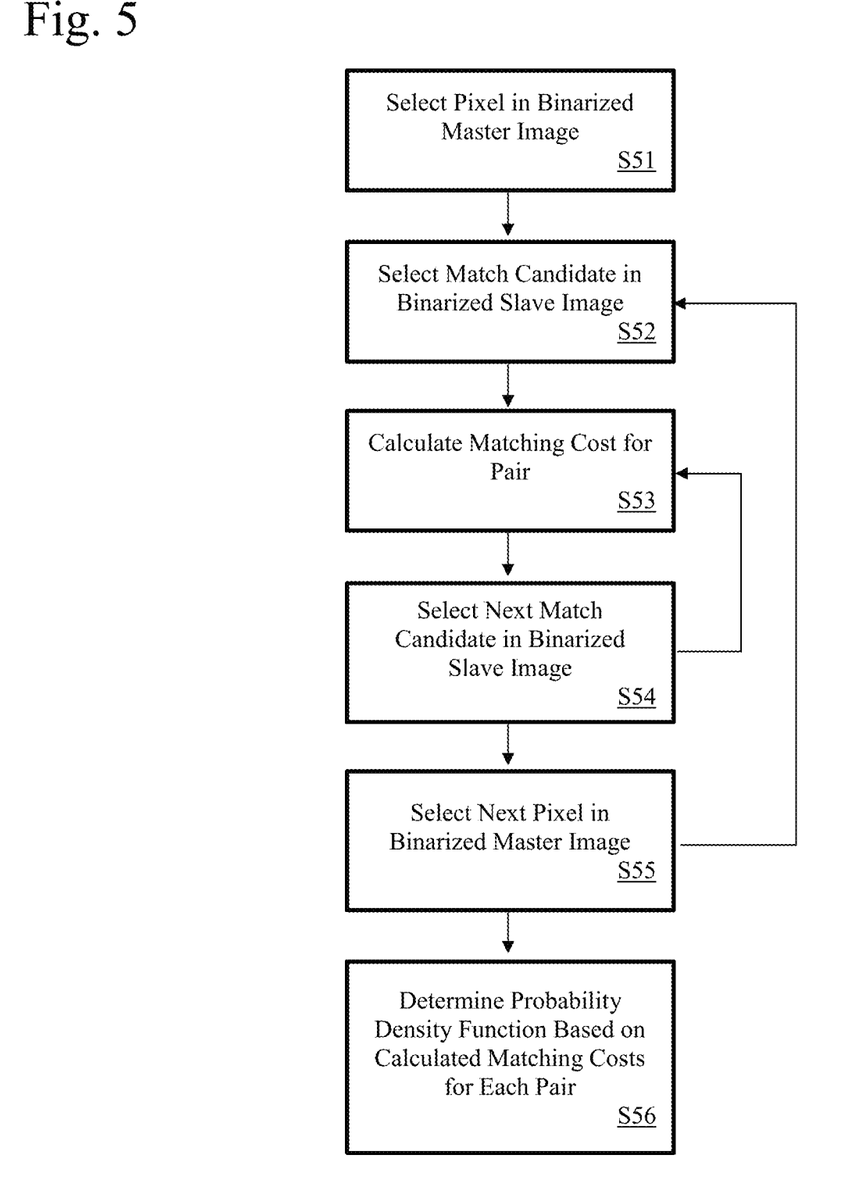
FIG. 5 is a flow chart illustrating an algorithm for performing matching cost calculation, in accordance with exemplary embodiments of the present invention.

An algorithm for performing matching cost calculation, in accordance with exemplary embodiments of the present invention, includes the following steps, which are illustrated in the flow chart of FIG. 5. First, a pixel in the binarized version of the master image is selected (Step S51). As mentioned above, pixels may be selected in any order, and may be selected, for example, in a raster pattern. A match candidate is then selected from the binarized version of the slave image (Step S52). A matching cost is then calculated for the selected binarized pixel of the master image and the selected match candidate pixel of the binarized slave image (referred to herein as the "selected pair" (Step S53). The matching cost may be calculated by examining a "patch" of a predetermined size (e.g. number of pixels) about each of the selected pixel of the binarized master image and the selected pixel of the binarized slave image. The number of mismatched pixels is then counted for the patch pair. A mismatch is when a corresponding pair of pixels within the corresponding patch do not share the same binary value. Accordingly, the total number of mismatches represents a degree of matching error, referred to herein as "matching cost."

Then, the next pixel within the binarized slave image is selected (Step S54) and then the matching cost is calculated for that new selected pair (again, Step S53). These steps may be repeated until the matching cost has been calculated for the first-selected pixel of the binarized master image and each pixel of the binarized slave image within a predefined search range (which may be set according to the needs of the images being matched). Then, a next pixel in the binarized master image may be selected (Step S55) and the process of calculating the matching cost for that pixel and each pixel of the binarized slave image within the search range may be performed. This process may be repeated until all the pixels of the binarized master pixel have been examined. Then, a probability density function may be calculated using all the calculated matching costs (Step S56). The probability density function may be a mathematical function that considers the cost functions of the aforementioned pixel pairs. For example, the probability density function may be calculated as follows:

$$pdf(x, y) = \frac{\exp(-\lambda \text{ matching cost}(x, y))}{\sum_{x',y'} \exp(-\lambda \text{ matching cost}(x', y'))}$$

where "(x,y)" are the horizontal and vertical coordinates of the candidate with respect to the pixel, "pdf(x,y)" is the probability density function generated from the matching cost evaluated at (x,y), "matching costs x,y)" is the matching cost the pixel and the candidate at (x,y), and $\lambda$ is a configurable parameter of the transformation allowing to control the probability density function width.

The probability density function, so calculated, may then be used to estimate a location of a best-matched candidate and may be used to provide a quantitative evaluation of the matching quality. In this way, the probability density function may be used to produce both the disparity output 26 and the confidence output 27 discussed above. For example, the disparity may be calculated as the mean value of the probability density function. The confidence may be calculated as a predetermined range related to a standard deviation of the probability density function.

It is noted that according to existing approaches, disparity estimation is performed by highly complicated algorithms that are not suitable for being performed by special-purpose hardware processing devices such as application-specific instruction set processors (ASIP). This is because hardware-compatible algorithms for disparity evaluation are limited to small supports since the matching complexity scales proportionally to the support size. According to exemplary embodiments of the present invention, by performing matching on binarized images, calculation is simplified enough to allow for hardware implementations while using relatively large support sizes. In particular, exemplary embodiments of the present invention may be effectively embodied as hardware at least because of its locality, whereby each pixel's disparity is determined by its close neighbors, and because of its simplicity, where the cost calculation matching may be performed without requiring excessive computational expense. Here, the matching comes down to single bit comparison which is easily achieved in customized hardware processors by the logical XOR operation.

Moreover, by embodying this approach as a hardware processor, disparity may be estimated in real-time from video streams, which would not currently be possible using software-implemented approaches.

Thus, exemplary embodiments of the present invention may be implemented as a hardware-implemented digital signal processor that receives the stereo images and outputs a measure of digital stereo image disparity and a measure of confidence in the digital stereo image disparity. The disparity and confidence images, as discussed above, may be used for various purposes such as to calculate a special distance between objects or depth of objects within a scene. As mentioned above, exemplary embodiments of the present invention may be used to calculate disparity and confidence for a sequence of image frames in real-time. These capabilities may be particularly useful in the fields of 3D modeling, augmented reality, autonomous driving, and the like.

Figure 6:
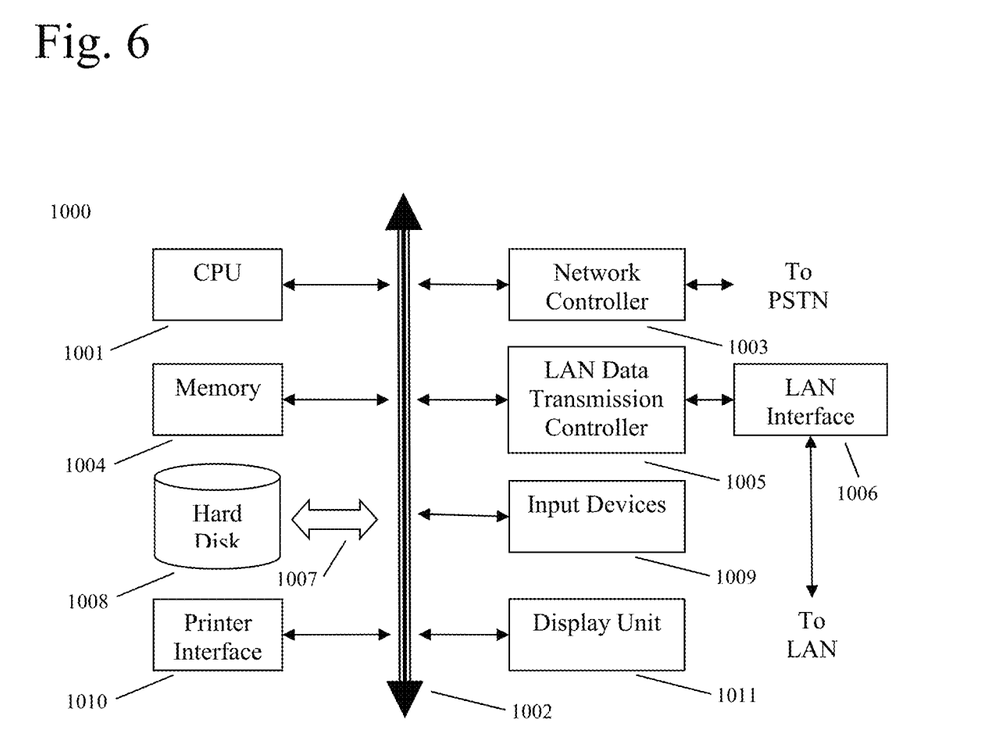
FIG. 6 shows an example of a computer system capable of implementing the method and apparatus according to embodiments of the present disclosure.

FIG. 6 shows an example of a computer system which may implement a method and system of the present disclosure. While the above-described approach may be embodied as a specialized digital signal processor, exemplary, embodiments of the present invention may alternatively be implemented within a computer system. For example, the system and method of the present disclosure may be implemented in the form of a software application running on a computer system, for example, a mainframe, personal computer (PC), handheld computer, server, etc. The software application may, be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for calculating disparity in a pair of images, comprising:
    receiving a first image of a scene and designating the first image as a master image;
    receiving a second image of the scene and designating the second image as a slave image;
    binarizing the master image to produce a binarized master image;
    binarizing the slave image to produce a binarized slave image;
    calculating a matching cost associated with matching each pixel within the binarized master image with a corresponding set of candidate pixels within the binarized slave image;
    creating a probability density function based on the calculated matching costs associated with each pixel within the binarized master image; and
    using the created probability density function to produce a disparity for the master image and the slave image and to produce a confidence for the produced disparity.

2. The method of claim 1, wherein the steps of binarizing the master and slave images, calculating the matching costs, creating the probability density function, and producing the disparity and confidence are performed within a special-purpose digital signal processor.

3. The method of claim 2, wherein the special-purpose digital signal processor operates in real-time.

4. The method of claim 1, wherein binarizing each of the master image and slave image comprises:
    defining a list of supports of increasing size;
    selecting a pixel;
    selecting a support for the selected pixel from the defined list of supports;
    calculating a mean and standard deviation for the selected support about the selected pixel;
    assigning a binarized pixel value or selecting a next support according to a difference between the calculated mean and the selected pixel relative to a predetermined fraction of the calculated standard deviation; and
    repeating the steps of selecting the pixel, selecting the support, calculating the mean and standard deviation, and assigning a binarized pixel value for each pixel of the master image.

5. The method of claim 4, wherein assigning a binarized pixel value or selecting a next support according to a difference between the calculated mean and the selected pixel relative to a predetermined fraction of the calculated standard deviation, comprises:
    assigning the binarized pixel value as "1" when it is determined that the difference between the calculated mean and the selected pixel exceeds the predetermined fraction of the calculated standard deviation;
    assigning the binarized pixel value as "0" when it is determined that the difference between the calculated mean and the selected pixel is below the predetermined fraction of the calculated standard deviation; and
    selecting a next support when it is determined that the difference between the calculated mean and the selected pixel is within the predetermined fraction of the calculated standard deviation.

6. The method of claim 1, wherein calculating the matching cost, comprises:
    selecting a pixel in the binarized master image;
    selecting a match candidate in the binarized slave image;
    calculating a matching cost for the selected pixel in the binarized master image and the selected match candidate in the binarized slave image; and
    repeating the steps of selecting the pixel in the binarized master image, selecting the match candidate in the binarized slave image, and calculating the matching cost, for each pixel of the binarized master image and each corresponding match candidate in the binarized slave image.

7. The method of claim 6, wherein the probability density function is determined based on the calculated matching costs for each pixel of the binarized master image and each corresponding match candidate in the binarized slave image.

8. The method of claim 1, wherein the first image and the second image are acquired from two cameras, a single camera with two image sensors, or a single camera moved between two locations and/or two angles.

9. The method of claim 1, wherein the produced disparity is instantiated as an image comprising a plurality of pixels, the value of each being set according to a degree of disparity between the first image and the second image at a corresponding pixel location.

10. The method of claim 9, wherein the value of each of the plurality of pixels of the disparity image are greater for greater disparities and lesser for lesser disparities.

11. The method of claim 9, wherein the produced confidence is instantiated as an image comprising a plurality of pixels, the value of each being set according to a degree of confidence for a corresponding pixel of the disparity image.

12. The method of claim 11, wherein the value of each of the plurality of pixels of the confidence image are greater for greater degrees of confidence and lesser for lesser degrees of confidence.

13. A system for generating a 3D model, comprising:
    one or more cameras for acquiring a first image of a scene and a second image of the scene;
    a special-purpose digital signal processor configured to:
    binarize the acquired first image to produce a binarized master image;
    binarize the acquired second image to produce a binarized slave image;
    calculate a matching cost associated with matching each pixel within the binarized master image with a corresponding set of candidate pixels within the binarized slave image;
    create a probability density function based on the calculated matching costs associated with each pixel within the binarized master image; and use the created probability density function to produce a disparity image for the master image and the slave image and to produce a confidence image for the produced disparity; and a display device configured to display a three-dimensional rendering based on the produced disparity image and/or the produced confidence image.

14. The system of claim 13, wherein the special-purpose digital signal processor is configured to operate in real-time.

15. The system of claim 13, wherein the special-purpose digital signal processor is configured to binarize each of the master image and slave image by:

defining a list of supports of increasing size;
selecting a pixel;
selecting a support for the selected pixel from the defined list of supports;
calculating a mean and standard deviation for the selected support about the selected pixel;
assigning a binarized pixel value or selecting a next support according to a difference between the calculated mean and the selected pixel relative to a predetermined fraction of the calculated standard deviation; and
repeating the steps of selecting the pixel, selecting the support, calculating the mean and standard deviation, and assigning a binarized pixel value for each pixel of the master image.

16. The system of claim 13, wherein the special-purpose digital signal processor is configured to calculate the matching cost, by:

selecting a pixel in the binarized master image;
selecting a match candidate in the binarized slave image;
calculating a matching cost for the selected pixel in the binarized master image and the selected match candidate in the binarized slave image; and
repeating the steps of selecting the pixel in the binarized master image, selecting the match candidate in the binarized slave image, and calculating the matching cost, for each pixel of the binarized master image and each corresponding match candidate in the binarized slave image.

17. The system of claim 13, wherein the special-purpose digital signal processor is configured:

to produce the disparity image such that a value of each pixel of the disparity image is set according to a degree of disparity between the first image and the second image at a corresponding pixel location, wherein the value of each of the plurality of pixels of the disparity image are greater for greater disparities and lesser for lesser disparities; and
to produce the confidence image such that a value of each pixel of the confidence image is set according to a degree of confidence for a corresponding pixel of the disparity image, wherein the value of each of the plurality of pixels of the confidence image are greater for greater degrees of confidence and lesser for lesser degrees of confidence.

18. A computer system comprising:

a processor; and
a non-transitory, tangible, program storage medium, readable by the computer system, embodying a program of instructions executable by the processor to perform method steps for calculating disparity in a pair of images, the method comprising:
receiving a first image of a scene and designating the first image as a master image;
receiving a second image of the scene and designating the second image as a slave image;
binarizing the master image to produce a binarized master image;
binarizing the slave image to produce a binarized slave image;
calculating a matching cost associated with matching each pixel within the binarized master image with a corresponding set of candidate pixels within the binarized slave image;
creating a probability density function based on the calculated matching costs associated with each pixel within the binarized master image; and
using the created probability density function to produce a disparity for the master image and the slave image and to produce a confidence for the produced disparity.

19. The computer system of claim 18, wherein binarizing each of the master image and slave image comprises:

defining a list of supports of increasing size;
selecting a pixel;
selecting a support for the selected pixel from the defined list of supports;
calculating a mean and standard deviation for the selected support about the selected pixel;
assigning a binarized pixel value or selecting a next support according to a difference between the calculated mean and the selected pixel relative to a predetermined fraction of the calculated standard deviation; and
repeating the steps of selecting the pixel, selecting the support, calculating the mean and standard deviation, and assigning a binarized pixel value for each pixel of the master image.

20. The computer system of claim 18, wherein calculating the matching cost, comprises:

selecting a pixel in the binarized master image;
selecting a match candidate in the binarized slave image;
calculating a matching cost for the selected pixel in the binarized master image and the selected match candidate in the binarized slave image; and
repeating the steps of selecting the pixel in the binarized master image, selecting the match candidate in the binarized slave image, and calculating the matching cost, for each pixel of the binarized master image and each corresponding match candidate in the binarized slave image.

* * * * *